UNITED STATES PATENT OFFICE.

THOMAS D. GREENLEY, OF GLEN RIDGE, NEW JERSEY, ASSIGNOR TO ELLIS-FOSTER COMPANY, A CORPORATION OF NEW JERSEY.

MAKING PHTHALIC ANHYDRID.

1,261,022.     Specification of Letters Patent.     Patented Apr. 2, 1918.

No Drawing.     Application filed March 13, 1917. Serial No. 154,477.

*To all whom it may concern:*

Be it known that I, THOMAS D. GREENLEY, a citizen of the United States, residing at Glen Ridge, in the county of Essex and State of New Jersey, have invented certain new and useful Improvements in Making Phthalic Anhydrid, of which the following is a specification.

This invention relates to a process of making phthalic anhydrid and acid products derived by treatment of naphthalene or kindred material with sulfuric acid, particularly with ordinary sulfuric acid or with oleum at elevated temperatures and is directed to the making of such products while obtaining larger yields than those heretofore obtained by usual processes.

In the manufacture of phthalic anhydrid by the oxidation of naphthalene with fuming sulfuric acid in the presence of sulfate of mercury a very large proportion of sulfuric acid is employed in order to secure a sufficient degree of oxidation and it is customary to mix the naphthalene and this excess of acid with the sulfate of mercury, heating up to a temperature at which reaction takes place and in collecting the sublimate of phthalic anhydrid formed. In carrying out this process yields ordinarily of only ten per cent. to thirty per cent. are obtained resulting in a material of high cost and oftentimes of little value owing to injurious side reactions causing contamination of the product.

By the present process, while a substantial excess of sulfuric acid is preferably employed, the acid oxidizing agent is preferably added in successive portions under conditions of temperature to allow of more favorable action, permitting of the progressive oxidation of the naphthalene without injurious carbonization or complete oxidation to carbon dioxid to take place resulting in yields more nearly approaching the theoretical amount and in many cases affording yields of 60–80%.

The following example will be given to illustrate one method of producing phthalic anhydrid in accordance with the present invention but it should be understood that such illustrative procedure is in nowise intended to limit the invention to such details of operation, as various modifications consistent with the general theme of the process hereof may be carried out in such manner as may be desired.

The first step in the operation is to prepare as an activator or accelerator of reaction a quantity of sulfate of mercury which may be produced by heating and stirring 10 lbs. of mercury with 100 lbs. of oleum containing 20% $SO_3$, the temperature being raised to 200° C. and maintained at that point with constant agitation for a period of about one hour. Of course, if mercury sulfate is available from other sources or from a preceding run, it is not necessary to prepare the sulfate in this manner.

30 lbs. of naphthalene are dissolved in 100 lbs. of oleum of the same strength as the foregoing and this solution or mixture is added to the mercury sulfate in acid solution prepared as above set forth. The mixture is heated in a retort to 250° C. and is maintained at this temperature until about one-half of the reaction mass has distilled over. During this heating and distilling operation the reaction mass may be well agitated and to this end the retort is equipped with a stirring device which may be operated so as to give a mild to vigorous agitation, depending upon the size and shape of retort and conditions of operation. In any event, preferably the agitation is carried out in such a manner as to secure a satisfactory intermingling of the reacting constituents. The mass is then cooled to about 200° C. and 100 lbs. of oleum are added. The temperature is then raised to about 250°, the other conditions being the same as the foregoing. After distillation has been completed to about one-half the volume of the reaction mass, 150 lbs. of oleum are added and the temperature carefully raised to about 300° C.

The distillate may then be filtered, treated with caustic soda solution and again filtered, the alkaline solution neutralized and evaporated to dryness. To purify, the mass is heated to the subliming point of phthalic anhydrid which product is suitably collected and may be suitably purified as desired.

From the foregoing it will be noted that in one embodiment of the invention one preferred feature is that of successive addition of the acid reagent in portions or gradually until the total amount of oxidizing agent required is introduced into the reaction mass; while a second preferred or optional feature is that of heating up to a temperature approaching the decomposition point and then allowing the mass to cool down until a temperature of about 200° C. is reached, at which point digestion apparently takes place with resulting desirable improvement in the yield of phthalic anhydrid. Another feature which may be used in some cases is that of distillation of about one half of each charge of acid before adding a further charge. The following features separatively or collectively form a part of some forms of the present invention, namely; the incorporation of an acid oxidant such as sulfuric acid or equivalent acid reagent in portions and the variation in the temperature from high to lower points during the operation, preferably carrying out such variation in a successive manner so that the curve of temperature would show fairly regular undulations, also preferably distilling off a portion, preferably about one half of each charge before adding another and in finally preferably raising the temperature to about 300° C. to liberate practically all of the phthalic anhydrid from the reaction mass.

In carrying out this reaction and perhaps owing to the proportion of acid employed, a large volume of oxids of sulfur are produced and may be collected and conveyed to sulfuric acid chambers for the conversion to sulfuric acid, or the sulfur trioxid may be absorbed by sulfuric acid, of about 100% strength and the residue of sulfur dioxid is suitably oxidized to sulfur trioxid or sulfuric acid.

The process herein set forth is not confined merely to the oxidation of naphthalene in this manner but may embrace naphthalene derivatives (bodies containing the naphthalene ring or nucleus) including some sulfuric acid compounds as well as the purified product.

It should of course be understood that the process is not limited to the use of sulfate of mercury. Other suitable mercury compound or other material having properties equivalent to that of mercury or the mercury sulfate may be employed herein as desired and whenever the term "mercury" or "mercury sulfate" is used herein it is understood to mean a body functioning as mercury or mercury sulfate acts in the present process as an accelerator or assistant of the reaction. Thus various other metals or sulfates may be used alone or in conjunction with mercury including chromium, manganese, iron, lead and the like according to conditions of operation, etc.

Furthermore I do not limit myself to the use of oleum in the foregoing process but may use 66° sulfuric acid, 98% acid, and the like, or mixtures of these, to such an extent as may be desired. For example, in the foregoing procedure, a mixture of from 20 to 50 parts of oleum may be incorporated with sufficient 66° or 98% sulfuric acid to make 100 parts of the acid mixture and the latter used in place of the pure oleum, thus reducing the cost of the operation to some extent. Furthermore the process is not limited to the use of acid of any given strength throughout the operation as stronger acid may be used at the beginning of the process and weaker acid at a little later stage in the operation, or preferably the stronger acid is added to a greater extent during the later stages of the process in order to bring about the most satisfactory conditions for completion of the reaction.

In the claims, the term "naphthalene" is intended to include not only the body $C_{10}H_8$, but such derivatives and substitution products thereof as are the equivalent thereof, in the process, for example the sulfonic acid derivatives above referred to.

What I claim is:—

1. The process of making phthalic anhydrid which comprises heating a reaction mixture comprising naphthalene and fuming sulfuric acid in the presence of an accelerator of reaction, at a temperature of at least 200° C., the acid being added in portions.

2. The process of making phthalic anhydrid which comprises heating naphthalene with fuming sulfuric acid in the presence of an accelerator of reaction, at a temperature of about 250° C., the acid being added in portions.

3. The process of making phthalic anhydrid which comprises heating and reacting on naphthalene in the presence of an accelerator of reaction, with fuming sulfuric acid, the latter being added in portions.

4. The process of making phthalic anhydrid which comprises heating naphthalene and fuming sulfuric acid in the presence of an accelerator of reaction, at a temperature of between 200° C. and 300° C.

5. The process of making phthalic anhydrid which comprises heating naphthalene, mercury sulfate and fuming sulfuric acid at a temperature between 200–300° C. and intermittently dropping and then raising the temperature.

6. The process of making phthalic anhydrid which comprises heating naphthalene, mercury sulfate and fuming sulfuric acid and intermittently dropping and then raising the temperature.

7. The process of making phthalic anhydrid which comprises heating naphthalene, mercury sulfate and fuming sulfuric acid at a temperature between 200–300°C. and intermittently dropping and then raising the temperature, the acid required being added gradually in portions.

8. The process of making phthalic anhydrid which comprises heating naphthalene, mercury sulfate and fuming sulfuric acid at a reacting temperature, in intermittently dropping and then raising the temperature and in adding fresh portions of acid with each drop in temperature.

9. The process of making phthalic anhydrid which comprises heating naphthalene and sulfate of mercury with a mixture of sulfuric acid insufficient to complete the reaction and in adding additional quantities of sulfuric acid at intervals in portions until a sufficient quantity of sulfuric acid is present, in maintaining the reaction mass in a state of agitation and at an elevated temperature, and in collecting the phthalic anhydrid evolved from said reaction mass.

10. The process of making phthalic anhydrid which comprises heating naphthalene and sulfate of mercury with a mixture of sulfuric acid insufficient to complete the reaction and in gradually adding additional quantities of sulfuric acid until a sufficient quantity of sulfuric acid is present, in maintaining the reaction mass in a state of agitation and at an elevated temperature, and in collecting the phthalic anhydrid evolved from said reaction mass.

11. The process of making phthalic anhydrid which comprises heating naphthalene and sulfate of mercury with a mixture of sulfuric acid insufficient to complete the reaction and in gradually adding additional quantities of sulfuric acid until a sufficient quantity of sulfuric acid is present, in maintaining the reaction mass at an elevated temperature, and in collecting the phthalic anhydrid evolved from said reaction mass.

12. In the process of making phthalic anhydrid by heating a mixture of fuming sulfuric acid, naphthalene and mercury sulfate at a reacting temperature, the step which comprises causing the temperature alternately to rise and fall during the oxidation step.

13. In the process of making phthalic anhydrid by heating a mixture comprising fuming sulfuric acid and naphthalene and an assistant to the reaction at a reacting temperature, the step which comprises causing the temperature alternately to rise and fall in a predetermined manner, during the oxidation step.

14. In the process of making phthalic anhydrid by heating a mixture comprising fuming sulfuric acid and naphthalene and an assistant to the reaction at a reacting temperature, the step which comprises causing the temperature alternately to rise and fall during the oxidation period, and in adding additional quantities of acid during said period.

15. In the process of making phthalic anhydrid by heating a mixture of fuming sulfuric acid, naphthalene and mercury sulfate at a reacting temperature, the step which comprises causing the temperature to rise and fall in a predetermined manner between about 200 and 250° C., and in finally heating to about 300° C.

16. The process of making phthalic anhydrid which comprises heating naphthalene and sulfate of mercury and an insufficient quantity of fuming sulfuric acid to complete the reaction of oxidation of naphthalene to phthalic anhydrid, in raising the temperature of the mass to about 250° C., cooling and adding an additional quantity of fuming sulfuric acid, raising the temperature again to about 250° C., cooling and adding a further quantity of sulfuric acid and finally raising the temperature to about 300° C. to expel the residue of phthalic anhydrid from the reaction mass.

17. The process of making phthalic anhydrid which comprises heating naphthalene and sulfate of mercury and an insufficient quantity of fuming sulfuric acid to complete the reaction of oxidation of naphthelene to phthalic anhydrid, in raising the temperature of the mass to between 200-250° C., cooling and adding an additional quantity of fuming sulfuric acid, similarly raising the temperature again, cooling and adding a further quantity of sulfuric acid and finally raising the temperature still higher to expel the residue of phthalic anhydrid from the reaction mass.

18. The process of making phthalic anhydrid which comprises treating naphthalene and sulfate of mercury and an insufficient quantity of fuming sulfuric acid to complete the reaction of oxidation of naphthalene to phthalic anhydrid, in heating the mass to about 250° C., adding an additional quantity of fuming sulfuric acid, again heating and adding a further quantity of sulfuric acid and finally raising the temperature to about 300° C. to expel the residue of phthalic anhydrid from the reaction mass.

19. The process of making phthalic anhydrid which comprises treating naphthalene and sulfate of mercury and an insufficient quantity of fuming sulfuric acid to complete the reaction of oxidation of naphthalene to phthalic anhydrid, in heating the mass to a reacting temperature, cooling with addition of a further quantity of fuming sulfuric acid, and finally raising the temperature to about 300° C. to expel the residue of phthalic anhydrid from the reaction mass.

20. In the process of making phthalic anhydrid by heating a reaction mass comprising sulfuric acid, naphthalene and mercury sulfate, the step which comprises reacting with an insufficient amount of sulfuric acid and in adding successive portions of the acid at intervals until the amount required for the reaction has been introduced.

21. In the process of making phthalic anhydrid by heating a reaction mass comprising sulfuric acid, naphthalene and a reaction activator, the step which comprises reacting with an insufficient amount of sulfuric acid and in adding successive portions of the acid until the amount required for the reaction has been introduced.

22. In the process of making phthalic anhydrid by heating a reaction mass of sulfuric acid, naphthalene and a compound of mercury, the step which comprises starting the reaction with an insufficient amount of sulfuric acid and in adding successive portions of the acid at intervals until the amount required for the reaction has been introduced.

23. In the process of making phthalic anhydrid by heating a reaction mass comprising sulfuric acid, naphthalene, and an accelerator of reaction, the step which comprises starting the reaction with an insufficient amount of sulfuric acid and in adding successive portions of the acid at intervals until the amount required for the reaction has been introduced.

24. In the process of making phthalic anhydrid by the oxidizing action of sulfuric acid and mercury sulfate on naphthalene, the step which comprises heating and agitating the reaction mass and in adding the quota of sulfuric acid in successive portions.

25. In the process of making phthalic anhydrid by the oxidizing action of sulfuric acid and an assistant of reaction on naphthalene, the step which comprises heating and agitating the reaction mass and in adding the sulfuric acid in successive portions accompanied by intervals of cooling.

26. In the process of making phthalic anhydrid by the oxidizing action of sulfuric acid on naphthalene in the presence of an accelerator of reaction, the step which comprises heating and agitating the reaction mass and in adding the sulfuric acid gradually during the major part of the oxidizing stage.

27. In the process of making phthalic anhydrid by the oxidizing action of sulfuric acid on naphthalene in the presence of an accelerator of reaction, the step which comprises heating and agitating the reaction mass and in adding the quota of sulfuric acid gradually during the oxidizing stage.

28. In the process of making phthalic anhydrid by the oxidizing action of an acid oxidizing reagent on a body containing the naphthalene ring or nucleus in the presence of an activator of reaction, the step which comprises heating the reaction mass and during the course of the reaction in adding to said mass an additional quantity of the oxidizing agent.

29. In the process of making phthalic anhydrid by the oxidizing action of an acid oxidizing reagent on a body containing the naphthalene ring or nucleus in the presence of an activator of reaction, the step which comprises heating and agitating the reaction mass and during the course of the reaction in adding to said mass an additional quantity of the oxidizing agent.

THOMAS D. GREENLEY.